United States Patent
de Queiroz et al.

[19]

[11] Patent Number: 6,081,211

[45] Date of Patent: Jun. 27, 2000

[54] MINIMAL BUFFERING METHOD AND SYSTEM FOR OPTIMIZED ENCODING TABLES IN JPEG COMPRESSION

[75] Inventors: Ricardo L. de Queiroz, Pittsford; Reiner Eschbach, Webster; James E Bollman, Williamson, all of N.Y.

[73] Assignee: Xerox Corporation, Stamford, Conn.

[21] Appl. No.: 09/056,747

[22] Filed: Apr. 8, 1998

[51] Int. Cl.[7] ................................................. H03M 7/40
[52] U.S. Cl. ............................ 341/65; 341/67; 341/51
[58] Field of Search .................................. 341/65, 67, 51

[56] References Cited

U.S. PATENT DOCUMENTS

| | | | |
|---|---|---|---|
| 5,287,420 | 3/1994 | Barrett | 382/56 |
| 5,677,689 | 10/1997 | Yovanof et al. | 341/50 |
| 5,835,034 | 11/1998 | Seroussi et al. | 341/65 |
| 5,844,508 | 12/1998 | Murashita et al. | 341/51 |
| 5,883,589 | 3/1999 | Takishima et al. | 341/67 |

*Primary Examiner*—Brian Young
*Assistant Examiner*—Jason L W Kost
*Attorney, Agent, or Firm*—Oliff & Berridge, PLC

[57] ABSTRACT

An apparatus, method and system optimizes Huffman codes within the Huffman tables without requiring buffering an entire uncompressed original image. Compression of a whole image is performed prior to storage in a buffer. Therefore, the necessary buffer size for performing computation of symbol frequencies in order to optimize Huffman codes is reduced. Default Huffman codes are used to pre-compress the image for storage in the buffer. Simultaneously, the input symbol frequency is determined to produce optimized Huffman codes. The optimized Huffman codes are used to optimally re-encode the encoded image data to reduce the space of the re-encoded data. The optimally encoded image data can then be stored and/or transmitted.

23 Claims, 5 Drawing Sheets

MINIMAL BUFFERING METHOD AND SYSTEM FOR OPTIMIZED ENCODING TABLES IN JPEG COMPRESSION

BACKGROUND OF THE INVENTION

1. Field of Invention

This invention relates to optimizing variable-length codes used in entropy encoding for use in data compression in accordance, and fully compatible, with the Joint Photographic Experts Group (JPEG) international standard for color image compression. Further description of that standard is made in ISO International Standard DIS 10918-1: Digital Compression Encoding of Continuous Tone Still Image Part 1, Requirements and Guidelines (also included in CCITT Recommendation T.81), and the disclosure of which is incorporated by reference. This invention relates to a method to achieve optimization without buffering the uncompressed image data. In a preferred embodiment of the invention the variable-length coding method is the Huffman coding procedure used in the JPEG standard.

2. Description of Related Art

JPEG image compression is a technique for compressing images using a set of image compression functions. JPEG comprises several steps for data compression: discrete cosine transformation (DCT), quantization, differential pulse-code modulation of the DC DCT coefficients (DC DPCM), zig-zag ordering, zero-run-length counting and entropy encoding. The images compressed with the JPEG compression are digital images.

Prior to compressing an original image, the original image must be sampled along a set of scan lines located at regular distances from each other. The sampled information scanned along each scan line is then converted into binary numbers which may be stored in a memory. The binary numbers, which represent a digital image, and which in turn represent the original image, are the data on which JPEG compression is performed.

The amount of data in a digital image can be extremely large—even millions of bytes. Assuming one byte per pixel, a very-low-resolution 320×240 pixel image occupies 76,800 bytes of memory. A document of 8½×11 inches, optically scanned at a resolution of 600 pixels per inch (ppi), generates images of 5100×6600 pixels, i.e. more than 30 million pixels. At one byte per pixel, more than 30 megabytes are required to store a single color plane. Color images for display or printing can require more than three times more memory to store the different color planes. Image compression is used to reduce the cost associated with storing of this digital image data and the cost and time associated with transmitting the data. That is, image compression is used to represent original images with less data to reduce storage and transmission costs and the transmission time.

FIG. 1 illustrates a JPEG compression system. As illustrated in FIG. 1, an original image is scanned, using a scanner, digital camera or the like, and sampled to produce a digital image. The binary data symbolizing the image is then processed using DCT to, ideally, produce uncorrelated coefficients. Each DCT coefficient is the amplitude of a specific cosine basis function. The principle of decorrelation of DCT coefficients is used during compression since each resulting coefficient can be further processed independently from other resulting coefficients without significant impact in compression efficiency. The DCT coefficients can also be further quantized using visually-weighted quantization values. Quantization is essentially a process of scaling the DCT coefficients and truncating them to integer values. Zig-zag ordering is a specific sequential ordering of the DCT coefficients from approximately the lowest spatial frequency to the highest spatial frequency.

As illustrated in FIG. 1, entropy encoding is the last step in JPEG compression. Run-length counting is the process of counting the number of zero DCT coefficients preceding a non-zero DCT coefficient within a zig-zag ordered DCT coefficients path to produce symbols representing the information of the DCT coefficients themselves and the number of preceding zeros. Entropy encoding employs a variable length code which actually generates the compressed data. Variable-length encoding requires that the code tables used during encoding be known at the start of encoding. In one type of entropy coding, Huffman encoding assigns a specific length code to each input symbol in the data depending on the assumed frequency of incidence of that symbol, aiming to minimize the average codeword length. The Huffman table contains these variable length codes. The Huffman table must be known in the Huffman encoder and in a Huffman decoder at a transmission destination or process termination point, for example, when displaying or printing the image.

The compression provided by Huffman encoding is a function of the frequency of the input symbols and a function of the length of the Huffman codes assigned to each symbol. JPEG often employs default Huffman tables, which are derived for standard continuous tone (contone) images, such as photographs. The default Huffman tables used in the JPEG standard have characteristics derived from distinctive image statistics that often differ from the characteristics of a Huffman table derived for use with specific images and applications. Examples of those applications include color facsimile transmission and in other applications using mixed raster content (MRC) segmented technology. In MRC, the contents of the images to be compressed under JPEG are parsed apart beforehand in such a way that planes may contain large amounts of background information, i.e., areas of constant color. Because the default Huffman tables are formulated for images that are not often encountered in color facsimile or other MRC based applications, the default Huffman tables do not efficiently or optimally encode the images usually encountered in these applications.

Conventionally, Huffman codes optimized for particular applications can improve the image quality and the compression ratio. The Huffman codes can be optimized by computing the actual frequency of the input symbols for the particular image to be compressed rather than relying on the default JPEG Huffman tables. FIG. 2 illustrates a conventional JPEG compression system that develops optimized Huffman codes and tables. As illustrated in FIG. 2, conventionally optimizing a Huffman table requires two passes over the whole DCT image data. The first pass determines the frequency of the input symbols and produces the optimized Huffman codes for the Huffman tables. The second pass actually encodes the image using the optimized Huffman table.

SUMMARY OF THE INVENTION

However, this conventional method for optimizing the Huffman codes requires two passes over the whole uncompressed image. This in turn requires the entire image to be buffered, which in turn requires a large amount of buffer memory. Therefore, the conventional method for optimizing Huffman codes is disadvantageous when used with image data that require large buffers, such as, for example, color images. In applications where buffering the whole uncompressed image data is unfeasible or impractical, such as, for example, color facsimile transmission, printing applications, etc., this conventional Huffman code optimization technique is of little or no use.

This invention provides an improved technique for optimizing Huffman codes within the Huffman tables which does not require buffering the entire uncompressed image data. The results are compatible with the optimization method described in the JPEG standard while saving memory and increasing processing speed as compared to the method known in the prior art.

In the method and system of this invention, the DCT image data is encoded, i.e., compressed, using default Huffman tables and subsequently stored in a buffer in compressed form. The necessary buffer size for generating optimized Huffman codes is thus reduced. Thus, in a first pass, the uncompressed DCT image data is encoded using default Huffman tables and the compressed image data is buffered. The symbol frequencies of the uncompressed DCT image data are determined to produce optimized Huffman codes. In a second pass, the original Huffman code symbols are replaced with the optimized Huffman code symbols.

The optimization technique is applicable to each single encoder within a multiple-encoder encoding system.

These and other features and advantages of this invention are described in or are apparent from the following detailed description of the preferred embodiment.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
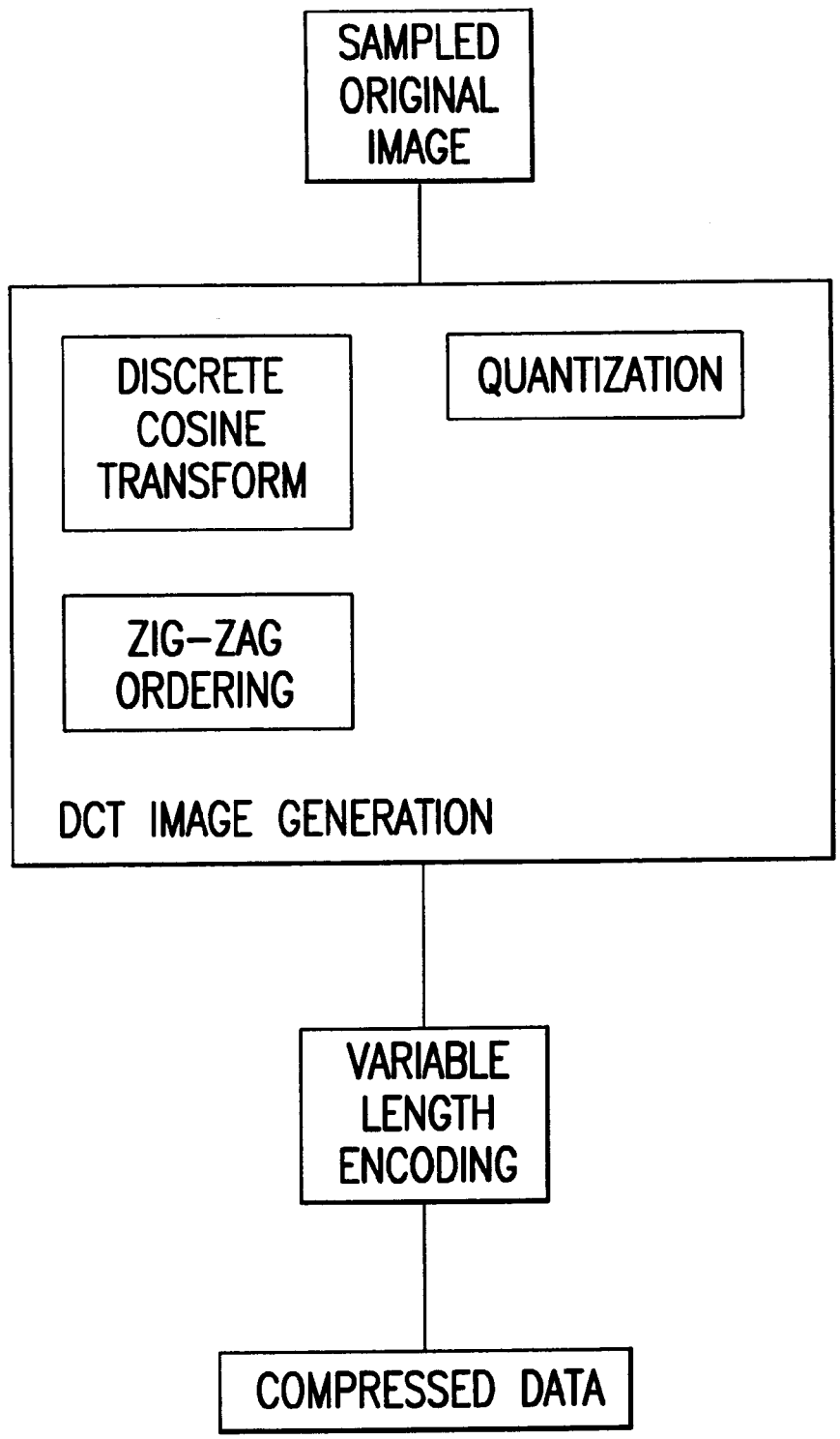
FIG. 1 illustrates a conventional JPEG compression system that uses default Huffman tables.
Figure 2:
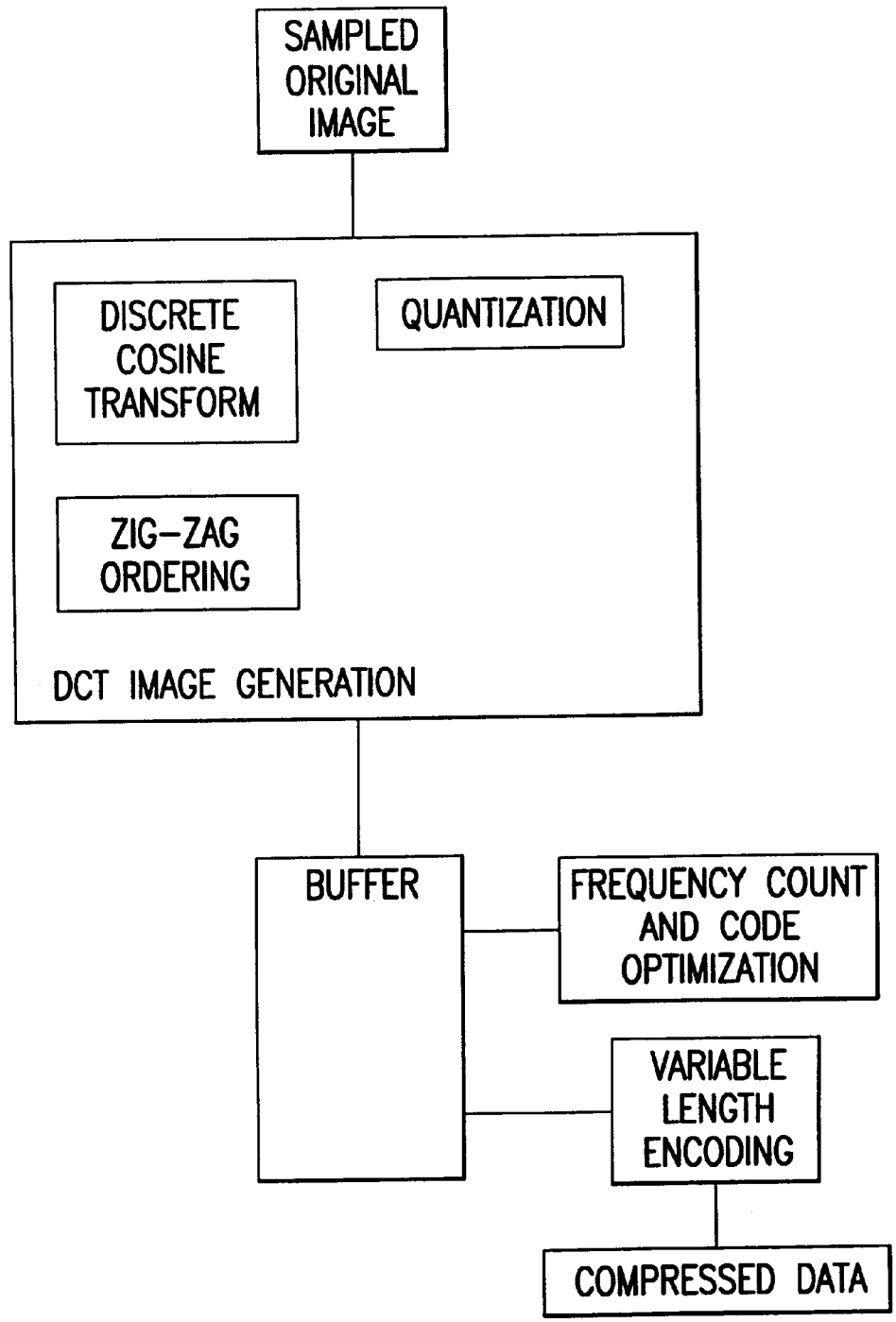
FIG. 2 illustrates a conventional JPEG compression system that develops and uses optimized Huffman tables.
Figure 3:
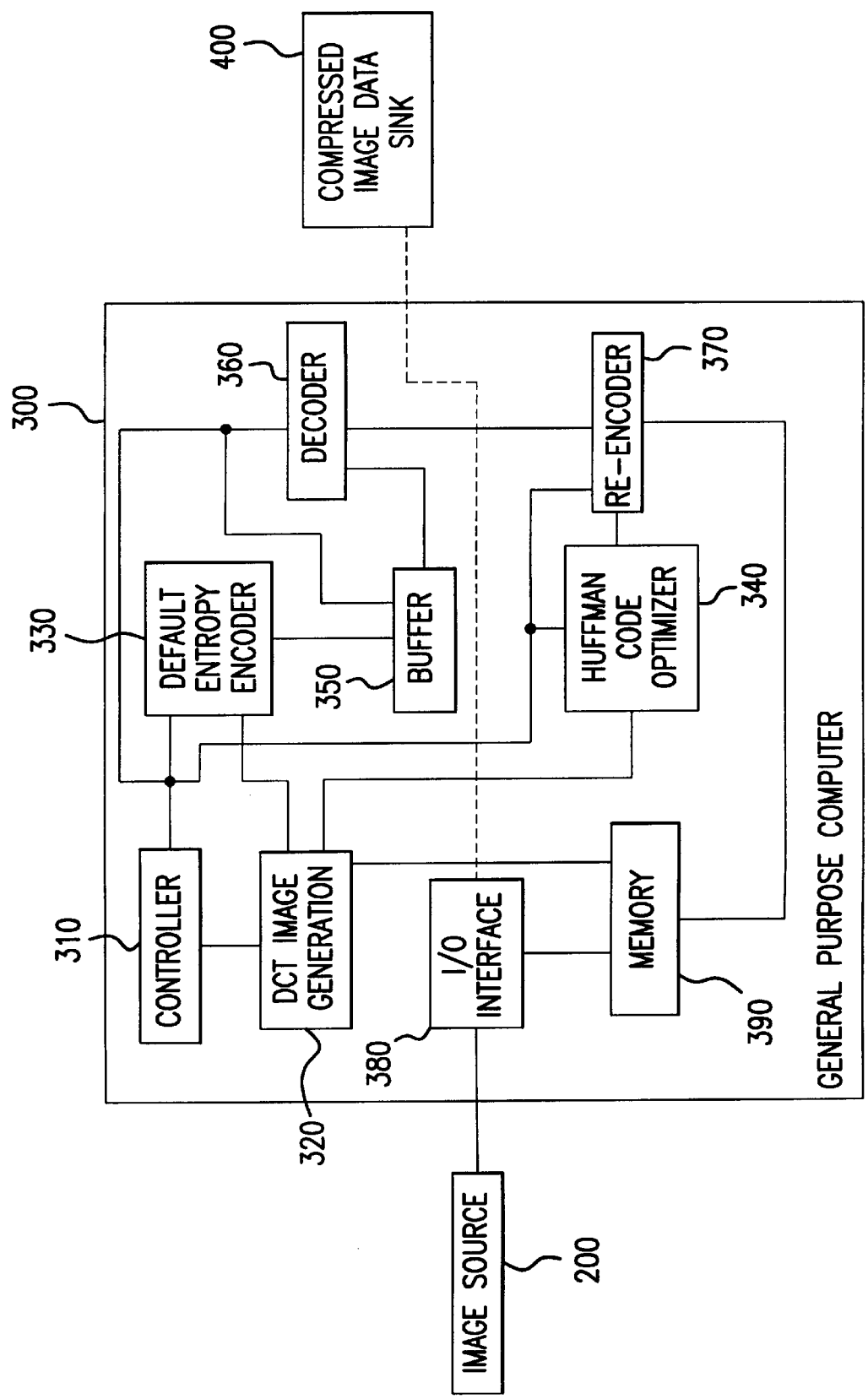
FIG. 3 illustrates a functional block diagram of an encoder according to this invention for optimally compressing image data using optimized Huffman codes.

FIG. 3 illustrates a functional block diagram of an encoder 300 according to one embodiment of the invention for optimally compressing image data using optimized Huffman codes. The encoder 300 is generally implemented using a general purpose computer. The encoder 300 comprises a controller 310, a DCT image generation section 320, a default entropy encoder 330, a Huffman code optimizer 340, a memory buffer 350, a decoder 360, a re-encoder 370, an input/output (I/O) interface 380 and a memory 390. As illustrated in FIG. 3, the controller 310 is operationally coupled to the DCT image generation section 320, the default entropy encoder 330, the Huffman code optimizer 340, the decoder 360 and the re-encoder 370 to direct these devices to operate in conjunction with each other to provide data encoded using optimized Huffman codes.

The image source 200 provides image data and may be, for example, a local scanner, local memory, a local area network, or a node of a distributed network. The compressed image data sink 400 may be, for example, a facsimile transmission device, a printer, a local memory, a local area network, or a node of a distributed network. The DCT image generation section 320 may perform, for example, DCT, quantization, DC DPCM and zig-zag ordering under the direction of the controller 310.

The image source 200 is operationally connected to the I/O interface 380. The I/O interface is operationally connected to the memory 390. The image source inputs the scanned image data into the memory 390 through the I/O interface 380 under the control of the controller 310. Once the scanned image data for a complete image is stored in the memory 390, the scanned image data can be converted to JPEG-compressed image data.

The DCT image generation section 320 is operationally coupled to the Huffman code optimizer 340 and the default entropy encoder 330. The default entropy encoder 330 encodes the data provided by the DCT image generation section 320 performing run-length counting to generate symbols and encoding the resulting symbols using default Huffman tables. The default entropy encoder 330 is operationally coupled to the memory buffer 350, which stores the encoded data produced by the default entropy encoder 330. The decoder 360 is operationally coupled to the buffer 350 and decodes the encoded data stored in the memory buffer 350.

The Huffman code optimizer 340 analyzes the symbol frequencies computed from the data provided by the DCT image generation section 320 and formulates optimized Huffman codes based on those input symbol frequencies using, for example, the methods provided in the JPEG standard. The Huffman code optimizer 340 is operationally coupled to the re-encoder 370 so that the re-encoder 370 may use the optimized Huffman codes formulated by the Huffman code optimizer 340. The re-encoder 370 is also operationally coupled to the decoder 360 and re-encodes the decoded data produced by the decoder 360. The re-encoder 370 is also operationally coupled to the memory 390.

Once the re-encoder 370 has optimally re-encoded the JPEG compressed image data, the JPEG compressed image data can either be stored in the memory 390, for later output through the I/O interface 380, or immediately output through the I/O interface 380 to the compressed image data sink 400.

Although FIG. 3 illustrates that the source 200 and the compressed image data sink 400 are separate from the general purpose computer implementing the encoder 300, it should be clear to one of ordinary skill in the art that either one or both of the image source 200 and the compressed image data sink 400 could be part of this general purpose computer. Similarly, the image source 200 and/or the compressed image data sink 400 could be part of a specific purpose computer, such as, for example, a scanner or facsimile transmission device.

In operation, an image may be scanned in blocks, immediately compressed and stored in memory. The image source 200 supplies scanned image data to the encoder 300 through the I/O interface 380. The encoder 300 stores the scanned image data in the memory 390 until it is to be JPEG-compressed. When the scanned image data is to be compressed, it is read out of the memory 390 in 8×8 blocks of image data. The 8×8 blocks of image data are input to the DCT image generation section 320, where they are converted to DCT, DC DPCM and DCT AC descriptors. The DCT, DC DPCM and DCT AC descriptors are simultaneously input to the default entropy encoder 330 and the Huffman code optimizer 340.

The default entropy encoder 330 encodes the descriptors using default codes formulated for standard contone images or default codes adapted for the application. The controller 310 then stores the default Huffman encoded data in the memory buffer 350. Simultaneously, the Huffman code optimizer 340 determines the frequencies of incidence for the descriptors and formulates optimized Huffman codes based on those frequencies. Once the image has undergone DCT transformation and the frequencies of incidence of the symbols of the transformed image are determined, an optimized Huffman table is generated from the determined frequencies of incidence.

That is, in a first pass, the symbol frequencies are generated and counted and the compressed image is stored. The optimal codewords are calculated based on the method disclosed in the JPEG standard. This calculation is relatively simple, may be performed on small amounts of data and can be performed very fast regardless of the size of the image.

Then, once the optimized Huffman table is generated, the default Huffman-encoded data could be optimized using the optimized Huffman table. The controller 310 then directs the decoder 360 to decode the default-Huffman-encoded data stored in the buffer 350 to provide decoded data to the re-encoder 370. The controller 310 directs the re-encoder 370 to re-encode the decoded data using the optimized Huffman codes provided by the Huffman code optimizer 340.

That is, once the optimal codes are available, a second pass is performed, wherein, the compressed data is transcoded, i.e., the Huffman codewords are replaced. The transcoding operation is performed by decompressing sections of compressed input data and immediately re-compressing the symbols, this time using optimized Huffman codewords without expanding the zero run counts.

Subsequently, the data encoded with optimized Huffman codes may be output to the compressed image data sink 400, or stored in memory 390 for storage or output from the I/O interface 380.

A DCT coefficient in JPEG is described by a sequence of symbols which are entropy encoded. More than one symbol may account for one coefficient. In the preferred embodiment of this invention the decompression step comprises simple Huffman decoding of symbols without the need for reconstructing the actual coefficients. The data is decompressed in sections and the sections should be as small as possible in order to save memory space.

In one embodiment of this invention, the data is decoded on a symbol by symbol basis. The re-compression step is performed by passing data, corresponding to symbols that are not encoded using the user-defined variable-length code table, unchanged to the output. The symbols which are encoded using customized tables are re-encoded using the optimized codewords. Alternatively, all the symbols in a data block may be decoded at the same time and re-encoded. Thus, the extra necessary memory space is only the amount of data necessary to store the symbols of a single block.

Since images in the printing business have very large resolution and storage for compression is often not viable, image data is commonly compressed by processing small sections of data at a time as often as they are provided by the image data source. The present invention allows the use of smaller memory buffers while allowing optimization of entropy coding. Also, since the transcoding operation from old to optimal codewords is performed on small amounts of data at a time, the amount of data read from a compressed buffer is relatively small, thereby reducing I/O access. Additionally, no complex operations such as DCT or sample reordering are necessary in the transcoding process. Further, the present invention also improves implementation speed compared to methods known in the prior art for buffering an entire uncompressed image in a two-pass compression.

Figure 4:
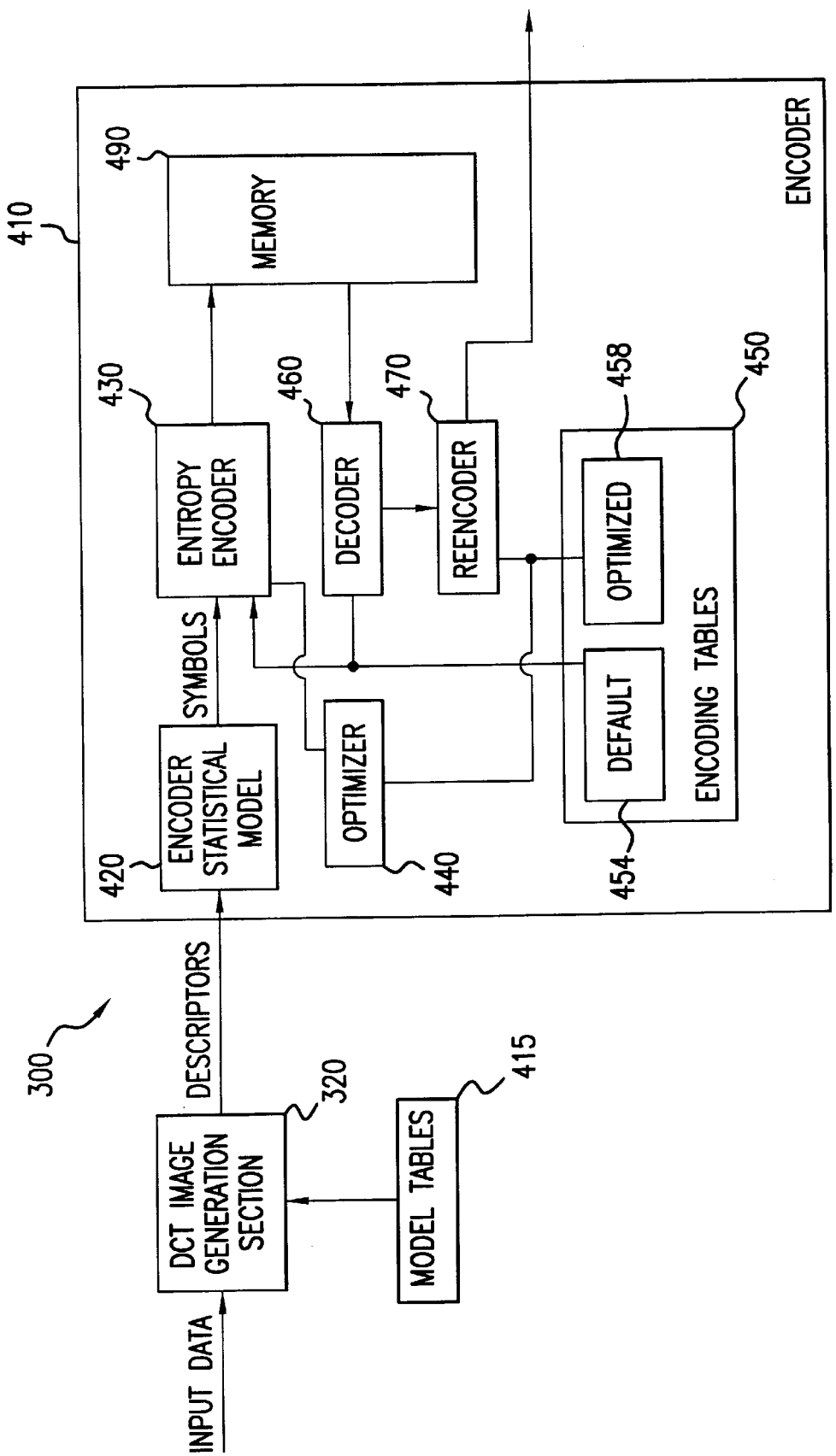
FIG. 4 illustrates a data compression encoder system for Huffman encoding in accordance with this invention.

FIG. 4 illustrates an encoder 300 in an alternative manner. As shown in FIG. 4, the DCT image generation section 320 uses modeling tables 415 to produce the descriptors. The entropy encoder 410 includes an encoder statistical model 420, an entropy encoder 430, an optimizer 440, encoding tables 450, including a default encoding table 454 and an optimized encoding table 458, a decoder 460 a re-encoder 470 and memory 490.

The DCT image generation section 320 generates a sequence of descriptors that are a mathematical representation of a digital image to be encoded. The encoder statistical model 420 converts these descriptors into symbols and transmits the symbols to the entropy encoder 430. The entropy encoder 430 encodes, i.e., compresses, the symbols to form the compressed data using the default encoding tables 454. The entropy code tables 450 are necessary for the entropy encoding and decoding procedures.

Figure 5:
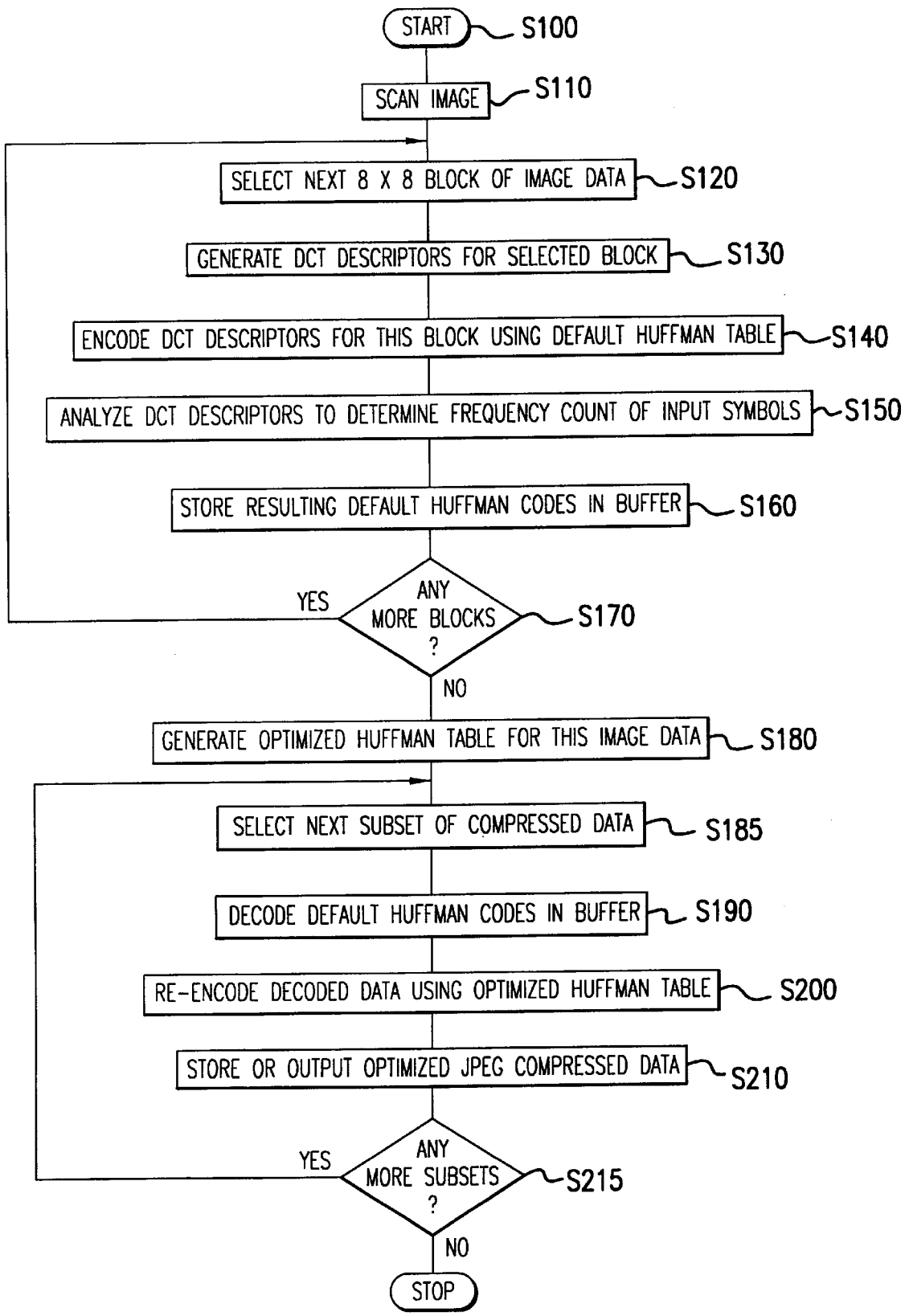
FIG. 5 illustrates a data compression encoding method according to this invention for optimally compressing image data using optimized Huffman codes.

Optimizing the entropy codes is performed by the optimizer 440 in cooperation with the entropy encoder 430. The optimized entropy table 458 is produced by the optimizer 440. Decoder 460 decompresses the compressed data stored in the memory 490 using the default entropy codes 454. The optimized entropy codes 458 are then used by the re-encoder 470 to re-compress the de-compressed data FIG. 5 is a flow chart generally outlining the Huffman table optimizing and optimized JPEG compression method of this invention. As outlined in FIG. 5, upon starting in step S100, control continues to step S110, where the image is scanned to generate the scanned image data. Then, in step S120, a first or next 8×8 block of the scanned image data is selected. Next, in step S130, DCT image data for this block is generated. In general, the DCT image data will be the DCT DC DPCM descriptors and the DCT AC descriptors for this block. Control then continues to step S140. In step S140, the uncompressed image is encoded, i.e., compressed, using default Huffman tables. Next, in step S150, the frequency count of the input symbols is determined. It should be appreciated that, while steps S140 and S150 are shown occurring sequentially in the encoder system 300 shown in FIG. 4, these steps are preferably performed simultaneously. Then, in step S160, the encoded data is stored in the memory buffer.

In step S170, the scanned image data is checked to determine if any more 8×8 blocks require processing. If more blocks must be processed, control returns to step S120. Otherwise, if all the blocks of the scanned image data have been processed, control continues to step S180.

In step S180, optimized Huffman codes are generated based on the input symbol frequencies determined instep S150. The amount of storage space necessary for buffering the image in step S160 is reduced by performing frequency counting in step S150, while simultaneously compressing the image data using default Huffman tables in step S140.

In step S185, a first or next subset of compressed image data is selected. Next, in step S190, the subset of default Huffman encoded data stored in the buffer is decoded. Subsequently, then, in step S200, the subset of decoded data is re-encoded using the optimized Huffman codes formulated in step S180. In step S210, the subset of encoded, i.e., compressed, image data may be stored or output.

Next, in step S215, the compressed image data is checked to determine if any more subsets require processing. If more subsets must be processed, control returns to step S185. Otherwise, if all the blocks of the compressed image data have been processed, control continues to step S220, where the processing stops.

In this invention, this encoder sequentially uses two different Huffman tables: The first Huffman table, the JPEG default Huffman table, is used to pre-compress the image for storage in the buffer. The first Huffman tables is also used during the determination of the input symbol frequency to produce optimized Huffman codes for the second Huffman table. The second Huffman table which is optimized, therefore dynamically created, is used in actually storing and/or transmitting the image. Encoding using the optimized Huffman codes only requires buffering data previously encoded using the default Huffman codes. Therefore, the optimization method of this invention reduces the required buffer size by 10 times or more.

One application of the optimization method of this invention is in conjunction with storing and transmitting color images. Color facsimile images are generated at a resolution of approximately 200 to 400 dpi (dots per inch) using JPEG compression. The color facsimile image may need to be stored prior to transmission, for example, when a destination telephone number is busy or the facsimile transmission device is transmitting previously entered facsimile images. However, an uncompressed color facsimile image can easily exhaust all available memory in the facsimile transmission device.

Optimizing the Huffman codes using the above-outlined method according to this invention can provide significant benefits in conjunction with, for example, color facsimile images containing large portions of text and graphics which must be compressed with a large degree of compression. The relative benefit of the optimization method of this invention over the conventional Huffman encoding techniques using default Huffman tables will be explained, herein, using illustrative examples which will convey the significance of the improvement to one of ordinary skill.

EXAMPLE 1

Compressing a 512 pixel×512 pixel constant white image provides a JFIF file size of approximately 3.3 kB. Compressing this image with the optimized Huffman table provides a file size of approximately 1 .KB. Therefore, the optimized Huffman code method of this invention improves the compression ration by nearly 3:1. The benefit of the optimization method of this invention should be readily appreciated in practical applications such as color image facsimile transmission and MRC-based image planes.

EXAMPLE 2

A test color-facsimile page scanned at 300 dpi was converted to gray-scale, generating a 7.1 MB file. After compression using JPEG and default Huffman tables, the compressed file had a memory size of 286 Kbytes. The same test color-facsimile page was compressed using JPEG and optimized Huffman tables optimized according to this invention, resulting in a compressed file with a memory size of 258 Kbytes for the same quantizer table, i.e., the same distortion levels. Therefore, a 10% decrease in necessary memory resulted from using the optimization technique of this invention.

As shown in FIG. 3, the encoder 300 is preferably implemented on a programmed general purpose computer. However, it should be appreciated that the encoder 300 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 5, can be used to implement the encoder 300.

In FIG. 3, the memory 390 and the buffer 350 are each preferably implemented using static or dynamic RAM. However, it should be appreciated that the memory 390 and the buffer 350 can each, independently, be implemented using a floppy disk and disk drive, a writable optical disk and disk drive, a hard drive, flash memory or the like. Moreover, the memory 390 and the buffer 350 can be physically separate memories or can be separate portions of the same physical memory device.

Further, it should be appreciated that the image service 200 and/or the compressed image data sink 400 can be connected to the encoder 300 using a wire or wireless link to a network (not shown). The network can be a local area network, a wide area network, an intranet, the Internet, or any other distributed processing and storage network.

While this invention has been described in conjunction with the specific embodiments and examples outlined above, it is evident that may alternatives, modifications and variations will be apparent to those skilled in the art. For instance, the data to be compressed need not be limited to color images; the present invention is advantageous for use in conjunction with storage and transmission of large quantities of data. Additionally, the compression of the image prior to buffering could be performed using Huffman codes which are not default Huffman codes but are Huffman codes formulated specifically for the type of application with which the invention is used in conjunction. Accordingly, the preferred embodiment of the invention, as set forth above, are intended to be illustrative not limiting. Various changes may be made without departing from the spirit and scope of the invention, as defined in the following claims.

What is claimed is:

1. A method for compressing data comprising:
   compressing input data using default entropy codes to produce compressed data at the same time as determining a frequency of incidence of input symbols contained in the input data;
   storing the compressed data in a buffer;
   formulating optimized entropy codes based on the determined frequency of incidence of the input symbols;
   ecompressing the compressed data using the default entropy codes; and re-compressing the decompressed data using the optimized entropy codes.

2. The method of claim 1, wherein the entropy codes are Huffman codes.

3. The method of claim 2, further comprising, prior to compressing the input data using said default entropy codes:
   digital cosine transforming the image data to form digital cosine transform data;
   quantizing the digital cosine transform data to form quantized data;
   zig-zag ordering the quantized data to form zig-zag ordered data; and
   run-length encoding the zig-zag ordered data to form run-length encoded data as the input data.

4. The method of claim 3, wherein the input data is color image data.

5. The method of claim 4, wherein decompressing and re-compressing the compressed data is performed on sections of the compressed data.

6. The method of claim 3, wherein decompressing and re-compressing the compressed data is performed on sections of the compressed data.

7. The entropy encoder of claim 6, wherein the input data is color image data and the entropy codes are Huffman codes.

8. The method of claim 2, wherein the input data is color image data.

9. The method of claim 1, further comprising, prior to compressing the input data using said default Huffman codes:

digital cosine transforming the image data to form digital cosine transform data;

quantizing the digital cosine transform data to form quantized data;

zig-zag ordering the quantized data to form zig-zag ordered data; and run-length encoding the zig-zag ordered data to form run-length encoded data as the input data.

10. The entropy encoder of claim 9, wherein said decoder section decompresses the first set of compressed data in sections to form sections of decompressed data and said second encoder section re-compresses the sections of decompressed data to generate sections of the second set of compressed data.

11. The method of claim 1, wherein the decompression and re-compression steps are performed on subsets of the compressed data.

12. The method of claim 1, wherein the input data is color image data.

13. An entropy encoder that compresses input data, comprising:

a first encoder section that compresses input data using a first set of entropy codes to form a first set of compressed data;

a memory that stores the first set of compressed data;

a code optimizer that determines frequencies of input symbols contained in the input data simultaneously with the compression of the input data performed by the first encoder section and that generates a second set of entropy codes based on the determined frequencies;

a decoder section that decompresses the first set of compressed data to form decompressed data; and a second encoder section that re-compresses the decompressed data using the second set of entropy codes to generate a second set of compressed data.

14. The entropy encoder of claim 13, wherein the input data is color image data.

15. The entropy encoder of claim 13, wherein the decoder section and the second encoder section process subsets of the first set of compressed data.

16. The entropy encoder of claim 13, wherein the entropy codes are Huffman codes.

17. An entropy encoder that compresses input data comprising:

first means for compressing input data using a first set of entropy codes to form a first set of compressed data;

memory means for storing the first set of compressed data;

means for determining frequencies of input symbols contained in the input data simultaneously with the compression of the input data by the first means for compressing;

means for generating a second set of entropy codes based on the determined frequencies;

means for decompressing the first set of compressed data to form decompressed data; and means for re-compressing the decompressed data using the second set of entropy codes to generate a second set of compressed data.

18. The entropy encoder of claim 17, wherein the input data is color image data.

19. The entropy encoder of claim 17, wherein the entropy codes are Huffman codes.

20. A data compression encoder system, comprising:

a preliminary encoder model that generates descriptors that represent input data;

an encoder statistical model that converts the descriptors into symbols;

an entropy encoder that receives the symbols converted by the encoder statistical model and that compresses the symbols using a first set of entropy codes to form a first set of compressed data; and a memory that stores the first set of compressed data;

wherein the entropy encoder determines frequencies of input symbols contained in the input data simultaneously with the compression performed by the entropy encoder and generates a second set of entropy codes based on the determined frequencies, the entropy encoder decompressing the first set of compressed data to form decompressed data and re-compressing the decompressed data using the second set of entropy codes to generate a second set of compressed data.

21. The data compression encoder system of claim 20, wherein the input data is color image data.

22. The data compression encoder system of claim 20, wherein the entropy codes are Huffman codes.

23. The data compression encoder system of claim 20, further comprising model tables accessed by the preliminary encoder model to generate the descriptors from the input data.

\* \* \* \* \*